United States Patent
Floch

(10) Patent No.: US 10,721,004 B2
(45) Date of Patent: Jul. 21, 2020

(54) METHOD OF DETECTING A DIRECTION OF ARRIVAL OF AT LEAST ONE INTERFERENCE SIGNAL AND SYSTEM TO CARRY OUT SAID METHOD

(71) Applicant: Astrium GmbH, Taufkirchen (DE)

(72) Inventor: Jean-Jacques Floch, Munich (DE)

(73) Assignee: ASTRIUM GMBH, Taufkirchen (DE)

( * ) Notice: Subject to any disclaimer, the term of this patent is extended or adjusted under 35 U.S.C. 154(b) by 261 days.

(21) Appl. No.: 13/895,496

(22) Filed: May 16, 2013

(65) Prior Publication Data
US 2013/0322505 A1    Dec. 5, 2013

(30) Foreign Application Priority Data

Jun. 1, 2012 (EP) .................................. 12004211

(51) Int. Cl.
| | | |
|---|---|---|
| *H04B 17/20* | (2015.01) | |
| *G01S 19/21* | (2010.01) | |
| *G01S 7/02* | (2006.01) | |
| *G01S 5/02* | (2010.01) | |

(52) U.S. Cl.
CPC ............ *H04B 17/20* (2015.01); *G01S 5/0215* (2013.01); *G01S 7/023* (2013.01); *G01S 19/21* (2013.01)

(58) Field of Classification Search
CPC .... H04B 7/086; H04B 7/0617; H04W 72/082
USPC ....... 375/267, 347; 342/357.59, 342.62, 372, 342/377; 455/562.1
See application file for complete search history.

(56) References Cited

U.S. PATENT DOCUMENTS

| | | | | |
|---|---|---|---|---|
| 6,075,484 | A * | 6/2000 | Daniel et al. ................. | 342/372 |
| 6,784,831 | B1 * | 8/2004 | Wang ...................... | G01S 19/21 |
| | | | | 342/357.63 |
| 7,539,273 | B2 * | 5/2009 | Struckman ............... | G01S 3/74 |
| | | | | 342/373 |
| 2002/0169578 | A1 | 11/2002 | Yang | |
| 2005/0053123 | A1 * | 3/2005 | Higuchi .............. | H01Q 3/2605 |
| | | | | 375/148 |
| 2005/0259006 | A1 * | 11/2005 | Kim et al. .................... | 342/377 |
| 2008/0036645 | A1 * | 2/2008 | Yamano .................. | G01S 7/023 |
| | | | | 342/109 |
| 2009/0066574 | A1 | 3/2009 | De Lorenzo et al. | |
| 2010/0194650 | A1 * | 8/2010 | Goransson et al. .......... | 343/703 |

OTHER PUBLICATIONS

Zheng, Yaohua. Adaptive Antenna Array Processing for GPS Receivers, University of Adelaide, Jul. 2008, 115 pgs.*

(Continued)

*Primary Examiner* — Patrick N Edouard
*Assistant Examiner* — Eboni N Giles
(74) *Attorney, Agent, or Firm* — Crowell & Moring LLP

(57) ABSTRACT

A method of detecting a direction of arrival of at least one interference signal interfering a wanted signal in a plurality of received signals involves receiving, by a number of antennas of an antenna array, a number of signals, identifying an interference signal in the received signals, applying a beam forming signal processing technique to the identified interference signal, and detecting the direction of arrival from the results of the beam forming signal processing.

8 Claims, 4 Drawing Sheets

(56) References Cited

OTHER PUBLICATIONS

Yipeng Liu, Jia Xu, Qun Wan and Yingning Peng, "Minimum variance multi-frequency distortionless restriction for digital wideband beamformer," Proceedings of 2011 IEEE CIE International Conference on Radar, Chengdu, 2011, pp. 353-355.*
Extended European Search Report dated Aug. 24, 2012 (seven (7) sheets).
Brown et al., "Locating the Jammer using A/J Software Receiver", Proceedings of ION GNSS, Sep. 24, 2004, pp. 110-121, XP55017928 (twelve (12) sheets).
European Office Action dated Apr. 16, 2015 (five pages).

* cited by examiner

METHOD OF DETECTING A DIRECTION OF ARRIVAL OF AT LEAST ONE INTERFERENCE SIGNAL AND SYSTEM TO CARRY OUT SAID METHOD

FIELD OF THE INVENTION

Exemplary embodiments of the present invention relate to a method of detecting a direction of arrival of at least one interference signal interfering a wanted signal in a plurality of received signals. This inventive method is preferably applied in global navigation satellite systems (GNSS). The invention is further directed to a device adapted to carry out the method.

BACKGROUND OF THE INVENTION

A common problem in the processing of signal data received by receiver chains connected to an antenna array is the amount of received data which have to be analyzed in order to characterize interference. An antenna array solution is one of the most promising techniques to get rid of the interferences. In the navigation signal processing field it is already known to apply a beam forming technique to a wanted signal in order to reject interferences and to improve significantly the navigation performance.

SUMMARY OF THE INVENTION

However, it can also be of interest to find out the sources of interferences (the interferers) or at least the direction of arrival of the interferences. Accordingly, exemplary embodiments of the present invention are directed to detecting a direction of arrival of at least one interference signal that interferes with a wanted signal in a plurality of received signals.

An exemplary method in accordance with the present invention provides a beam forming signal processing technique in order to precisely characterize an interference, the method involves the steps of identifying the at least one interference signal in the plurality of received signals;

applying a beam forming signal processing technique to the at least one identified interference signal;

evaluating the direction of arrival from the results of the beam forming signal processing step.

By applying the beam forming signal processing technique to both the wanted signal and the at least one interference signal, the invention provides the ability to analyze the interference and to cope with the high amount of data to be analyzed. Such an automatic detection of interferences using an antenna array is not known from the prior art.

In accordance with the present invention digital data are obtained from the signals received by the plurality of receivers, wherein each of the receivers is connected to at least one of the plurality of antennas, and the digital data coming from the digital receivers are collected to evaluate a cross-covariance matrix.

In another aspect the beam forming signal processing technique is a pre-correlation beam forming signal processing technique. However, also a post-correlation beam forming signal processing technique can be applied.

The evaluation step can be performed by applying a direction-of-arrival (DOA) algorithm to the cross-covariance matrix. Known algorithms like ESPRIT or MUSIC can be used.

The identification step can be performed by comparing the noise level of the received signal with a power level of a signal received from a potential interferer.

Exemplary embodiments of the present invention are also directed to a device, which comprises an antenna array with a plurality of antennas, a plurality of signal receivers wherein each of the receivers is connected to at least one of the plurality of antennas and a plurality of signal processing sub-systems which are adapted to carry out the method steps described above.

This invention allows the use of antenna array techniques to characterize the interference (time, frequency) with high accuracy. It is a good way to know whether the interference is intentional or non intentional. It may be possible to distinguish between signals allowed in the frequency band and interference. The interference is also a fingerprint of the interferer. It is a way to identify the user of the interferer.

The principle of this innovation is to use extra beams to define and characterize the interferences (DOA, time, frequency) in the band of interest for the GNSS signal tracking. As the sampling rate is very high, it is currently not possible to use all the available data. Thus, only some sequences of data including the presence of interferences is used to evaluate the covariance matrix to calculate the coefficients for the tracking beams and to detect the direction of arrival of the interferences.

BRIEF DESCRIPTION OF THE DRAWING FIGURES

The invention is hereinafter described by example with reference to the drawings. In these drawings FIG. 1 illustrates an exemplary method according to the present invention;

DETAILED DESCRIPTION OF THE INVENTION

Figure 1:
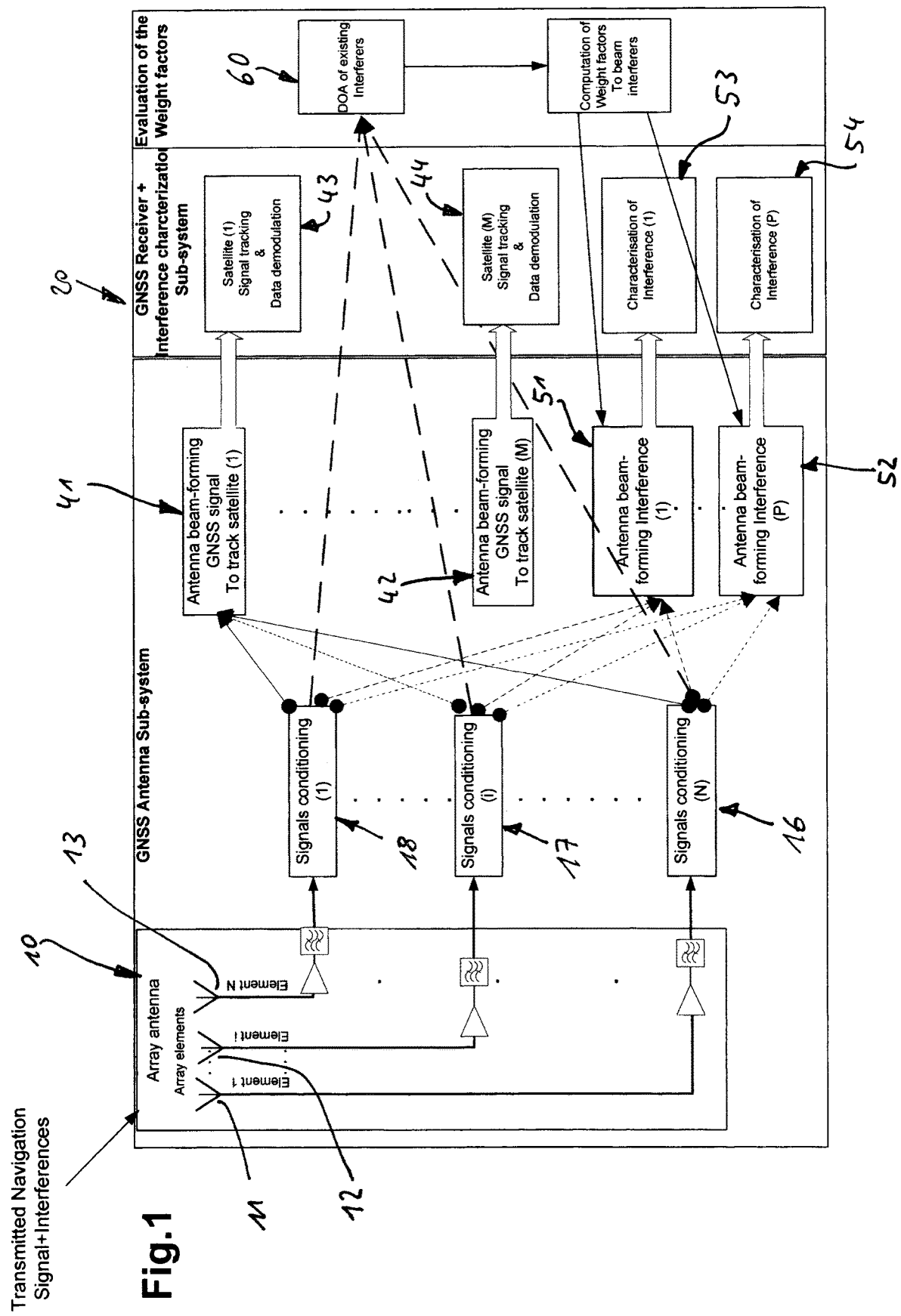
Figure 2:
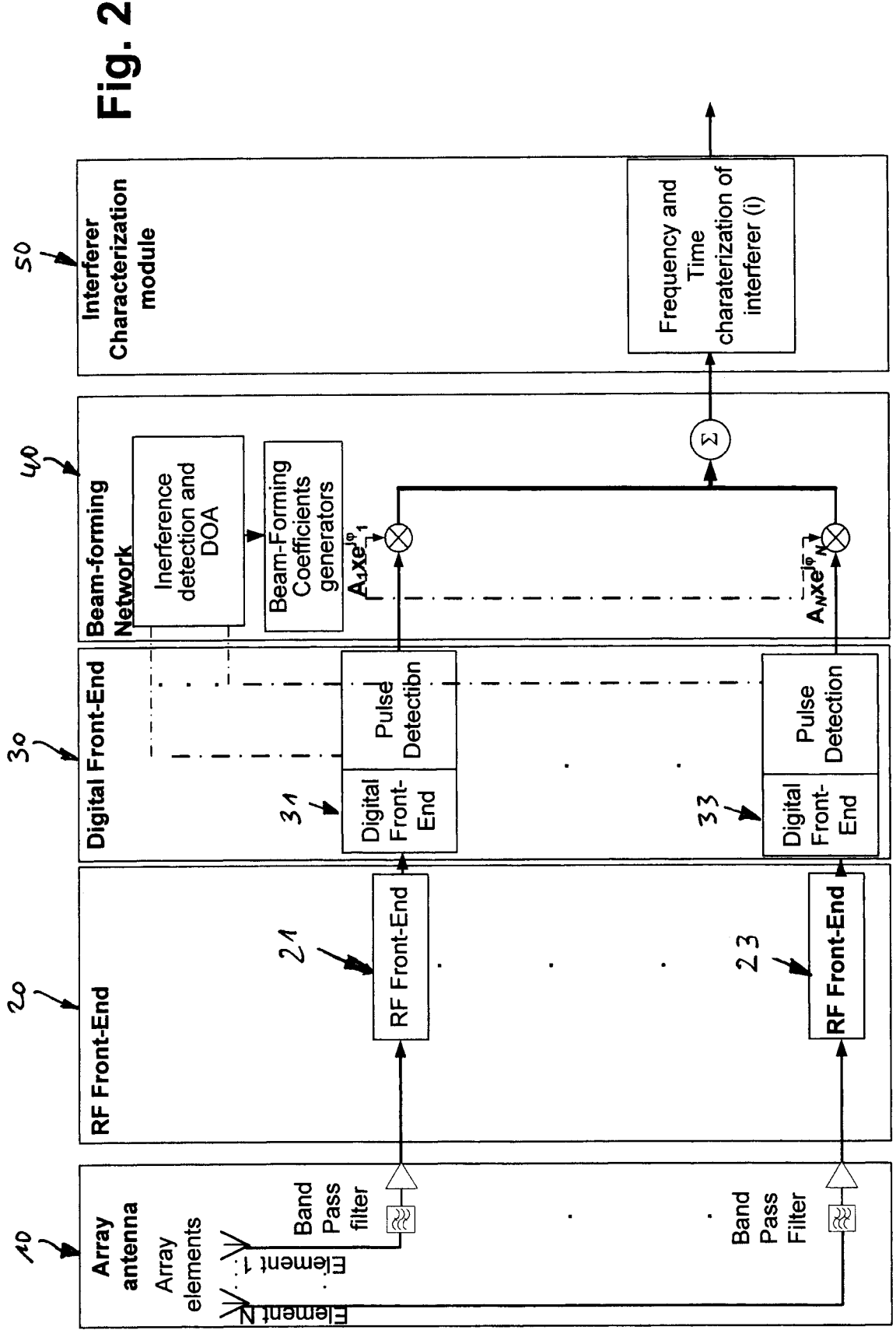
FIG. 2 illustrates an exemplary device according to the present invention.

As shown in FIG. 1 and FIG. 2 the digital data are coming from a number of N receiver chains. Each antenna element 11, 12, 13 of an antenna array 10 is connected to a signal conditioning unit 16, 17, 18 and is assigned to each receiver chain 21, 23 of a receiving front end 20. Each receiver chain is connected to an associated digital front-end 31, 33 of a digital front end unit 30.

The device shown in FIG. 1 is provided with a plurality of commonly known antenna beam-forming units 41, 42 of a beam-forming network 40 which are each used by a satellite signal tracking unit 43, 44 in order to track a related satellite from which the wanted signal is transmitted.

The inventive device is further equipped with second antenna beam-forming units 51, 52 which are used to detect the direction of arrival of a respective interference signal according to the method of the invention. The digital data coming from the N-receiver chains are collected in a DOA unit 60 to evaluate a cross-covariance matrix and the directions of arrival of the interferences are evaluated using a DOA algorithm (e.g. an ESPRIT algorithm or and MUSIC algorithm can be used).

The interferers are detected by comparing the noise level to the potential received interferer power level in a characterization unit 53, 54 of an interferer characterization module 50 connected to a respective beam-forming unit 51, 52.

The method will now be explained with respect to FIGS. 3 and 4.

Figure 3:
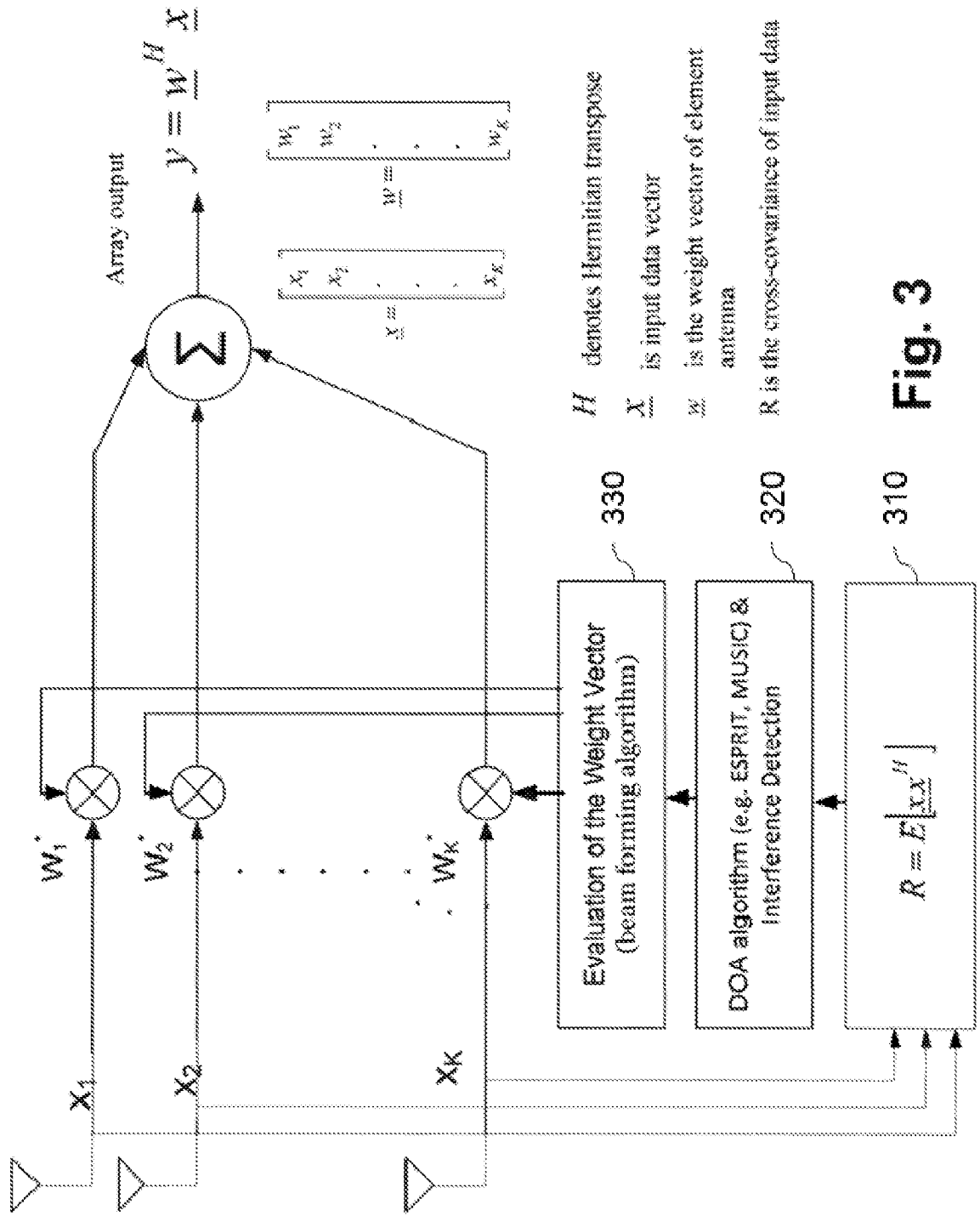
FIG. 3 illustrates an exemplary inventive method in the case of one interferer.

FIG. 3 considers that only one interferer has been found and therefore only one beam-former algorithm is performed. If P-interferers are detected (like in the example of FIG. 1), P beam-former algorithms are to be performed. Specifically, signals $X_1$-$X_K$ respectively received by a plurality of antennas are employed to calculate R, the cross-covariance of the input data (step 310). The calculated cross-covariance is used as part of a DOA algorithm and for interference detection (step 320), the results of which are used for the evaluation of the weight vector using a beam forming algorithm (step 330). The weights $W_1^*$=$W_K^*$ then applied to the incoming signals.

Figure 4:
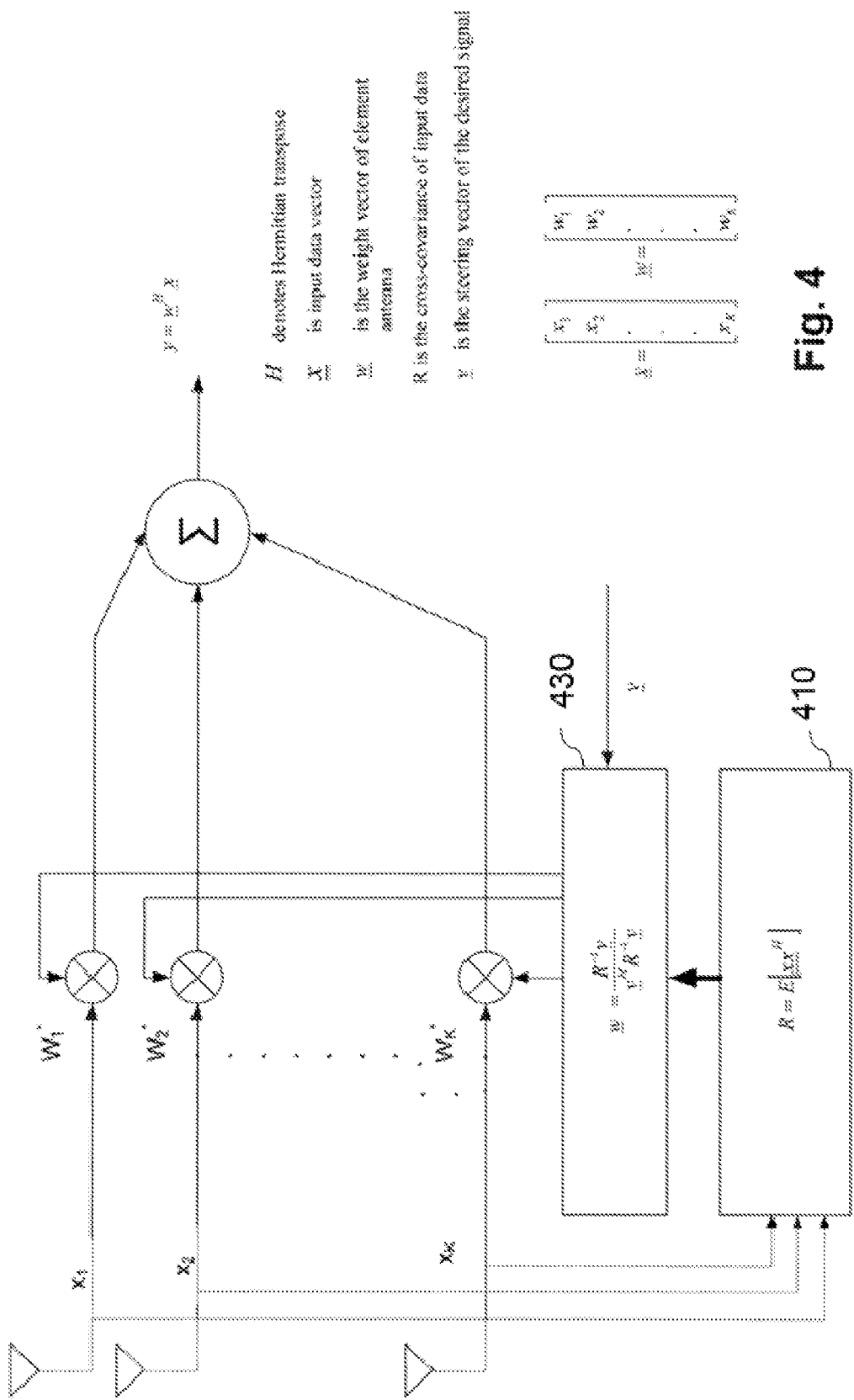
FIG. 4 illustrates an exemplary mathematical scheme of the inventive method in the case shown in FIG. 3.

In FIG. 4, the minimum variance distortionless response (MVDR) is proposed as an example for the beam-former algorithm. Other beam-former algorithms can be applied. The steering vector v of the desired signal (i.e. the interference) is easily evaluated knowing its azimuth and elevation. Specifically, signals $X_1$-$X_K$ respectively received by a plurality of antennas are employed to calculate R, the cross-covariance of the input data (step 410). The calculated cross-covariance, as well as the steering vector of the desired signal v, are used to determine the weight vector using a MVDR beam forming algorithm (step 430). The weights $W_1^*$=$W_K^*$ are then applied to the incoming signals.

Applying the beam-former algorithm on each interferer, the interference to noise ratio will increase. Interference time characterization will then be carried out only by extracting the digital samples after the beam-forming step. The frequency characterization will be carried out by usually known methods (e.g. the Welch method) after the beam-forming step.

The direction-of-arrival (DOA) algorithm is quite demanding in terms of time and processing. The first constraint is the data rate between the digital front-end and the beam-forming network (FIG. 2). As the frequency sampling is often very high with a high number of bit quantization, the entire digital samples may not be transmitted to the beam forming network.

There may also be some limitations (sequence length, quantization) on the amount of data to be processed to use the DOA algorithm. For noise like interference (wide band or narrow band interferences) there is no problem with decreasing the number of digital samples at the input of the algorithm by considering only a short sequence or by under-sampling. However, for pulse interferences, it may be critical, as the presence of the complete pulse is required to be able to detect it. The principle is shown in FIG. 2 for the characterization of the interference i. Each receiver chain has a pulse detector, similar to the one used for the pulse blanking. As soon as a pulse is detected in a chain, the same short sequence of samples including the pulse is sent by all the receiver chains to the DOA processor. If more than one pulse is detected, all the sample sequences containing pulses of each receiver chain are sent to the DOA processor. By this way, the amount of data to be processed is decreased and the required samples have been selected to correctly carry out the DOA algorithm.

The invention is not restricted to the above-described exemplary embodiment, which only serves for a general explanation of the core concept of the invention. Rather more, it is within the scope of protection that the method of detecting a direction of arrival of at least one interference signal and system to carry out the method in accordance with the invention could also adopt different forms than those of the embodiments described above. In particular thereby, the device may comprise features which represent a combination of the respective individual features of the claims.

The reference symbols in the claims, the description and the drawings serve only to provide a better understanding of the invention and are not intended to limit the scope of protection.

LIST OF REFERENCE SIGNS 10 antenna array
11 antenna element
12 antenna element
13 antenna element
16 signal conditioning unit
17 signal conditioning unit
18 signal conditioning unit
20 receiving front end
21 receiver chain
23 receiver chain
30 digital front end unit
31 digital front end
33 digital front end
40 beam-forming network
41 antenna beam-forming unit
42 antenna beam-forming unit
43 satellite signal tracking unit
44 satellite signal tracking unit
50 interferer characterization module
51 second antenna beam-forming unit
52 second antenna beam-forming unit
53 characterization unit
54 characterization unit

What is claimed is:

1. A method of characterizing an interference signal interfering with a wanted signal in a plurality of received signals, the method comprising:
receiving, by a plurality of antennas of an antenna array, the plurality of received signals;
identifying which of the plurality of received signals is the interference signal by comparing a noise level of the received signals to a power level of a potential interferer signal;
determining a direction-of-arrival (DOA) of the identified interference signal, wherein:
the determination of the DOA of the identified interference signal is based on a short sample sequence, including a single pulse of the interference signal, when only the single pulse is detected in the plurality of received signal, and
the determination of the DOA of the identified interference signal is based on additional sample sequences, which include pulses, when more than the single pulse is detected in the plurality of received signals;
applying a beam forming signal processing technique to the identified interference signal so as to form an estimation of the identified interference signal, as originally received by the plurality of antennas, by applying a weighting value to the identified interference signal, wherein the weighting value is computed based on the determined DOA of the identified interference signal;

characterizing the identified interference signal in terms of time and frequency, and the DOA of the identified interference signal, using results of the beam forming signal processing step.

2. A method according to claim 1, wherein digital data are obtained from the plurality of received signals received by a plurality of receivers, each of the receivers being connected to at least one of the plurality of antennas, and wherein the digital data coming from the digital receivers are collected to evaluate a cross-covariance matrix.

3. A method according to claim 1, wherein the beam forming signal processing technique is a pre-correlation beam forming signal processing technique.

4. A method according to claim 1, wherein the beam forming signal processing technique is a post-correlation beam forming signal processing technique.

5. A method according to claim 2, wherein the determining step is carried out by applying a direction-of-arrival (DOA) algorithm to the cross-covariance matrix.

6. A method of identifying a source of an interference signal interfering with a wanted signal in a plurality of received signals, the method comprising:
   receiving, by a plurality of antennas of an antenna array, the plurality of received signals;
   identifying which of the plurality of received signals is the interference signal by comparing a noise level of the received signals to a power level of a potential interferer signal;
   determining a direction-of-arrival (DOA) of the identified interference signal, wherein:
      the determination of the DOA of the identified interference signal is based on a short sample sequence, including a single pulse of the interference signal, when only the single pulse is detected in the plurality of received signal, and
      the determination of the DOA of the identified interference signal is based on additional sample sequences, which include pulses, when more than the single pulse is detected in the plurality of received signals;
   applying a beam forming signal processing technique to the identified interference signal so as to form an estimation of the identified interference signal, as originally received by the plurality of antennas, by applying a weighting value to the identified interference signal, wherein the weighting value is computed based on the determined DOA of the identified interference signal;
   characterizing the identified interference signal in terms of time and frequency, and the DOA of the identified interference signal, using results of the beam forming signal processing step; and
   identifying a source of the identified interference signal using the corresponding detected time, frequency, and DOA.

7. A method according to claim 1, wherein the identified interference signal is further characterized as either intentional or non-intentional based on the time and the frequency.

8. A method of characterizing an interference signal interfering with a wanted signal in a plurality of received signals, the method comprising:
   receiving, by a plurality of antennas of an antenna array, the plurality of received signals;
   identifying which of the plurality of received signals is the interference signal by comparing a noise level of the received signals to a power level of a potential interferer signal;
   determining a direction-of-arrival (DOA) of the identified interference signal, wherein:
      the determination of the DOA of the identified interference signal is based on a short sample sequence, including a single pulse of the interference signal, when only the single pulse is detected in the plurality of received signal, and
      the determination of the DOA of the identified interference signal is based on additional sample sequences, which include pulses, when more than the single pulse is detected in the plurality of received signals;
   applying a beam forming signal processing technique to the identified interference signal so as to form the identified interference signal by applying a weighting value to the identified interference signal, wherein the weighting value is computed based on the determined DOA of the identified interference signal;
   characterizing the identified interference signal in terms of time and frequency, and the DOA of the identified interference signal, using results of the beam forming signal processing step; and
   further characterizing the identified interference signal as either intentional or non-intentional based on the time and the frequency.

* * * * *